United States Patent [19]

Lapeyre

[11] Patent Number: 4,501,575

[45] Date of Patent: Feb. 26, 1985

[54] MULTI-SPEED TRANSMISSION FOR BMX BICYCLES AND THE LIKE

[76] Inventor: Fernand S. Lapeyre, 1224 Octavia St., New Orleans, La. 70115

[21] Appl. No.: 577,138

[22] Filed: Feb. 6, 1984

Related U.S. Application Data

[63] Continuation-in-part of Ser. No. 525,319, Aug. 22, 1983, abandoned.

[51] Int. Cl.³ .............................................. F16H 9/00
[52] U.S. Cl. ..................................... 474/74; 192/48.92
[58] Field of Search ................. 474/74, 73; 192/48.92, 192/45

[56] References Cited

U.S. PATENT DOCUMENTS

| | | | |
|---|---|---|---|
| 1,608,141 | 11/1926 | Sherjian | 474/74 |
| 2,065,938 | 12/1936 | Jessen | 192/48.92 X |
| 4,415,072 | 11/1983 | Shoji et al. | 192/45 |

Primary Examiner—James A. Leppink
Assistant Examiner—Frank H. McKenzie, Jr.
Attorney, Agent, or Firm—Nims, Howes, Collison & Isner

[57] ABSTRACT

A two speed rear wheel hub transmission for BMX bicycles and the like that can be utilized as original equipment or as a conversion kit. High and low speed drive sprockets are mounted with intermediary overrunning clutches on the rear wheel hub of a BMX bicycle with each adapted to be concurrently chain driven by larger diameter high and low speed sprockets commonly mounted on the pedal drive shaft. Both the high and low speed drive systems are normally biased into driving engagement with the rear wheel hub but with the high speed drive system normally overriding the low speed system which free wheels during normal high speed bicycle operation. Downshifting is effected by a manually induced counter-rotational precessing of the rear wheel mounted high speed drive sprocket for selective driving disengagement thereof and automatic, delay free shifting to the low speed drive without effective interruption of drive pedal sprocket rotation.

13 Claims, 22 Drawing Figures

MULTI-SPEED TRANSMISSION FOR BMX BICYCLES AND THE LIKE

This invention relates to multispeed bicycle transmissions and more particularly to a simple and rugged rear wheel hub located, multispeed transmission utilizable as original equipment or as a conversion kit, for BMX bicycles or the like.

This application is a continuation-in-part of abandoned application Ser. No. 06/525,319 filed Aug. 22, 1983.

Although bicycles have been extensively used for a long period of time, recent years have witnessed a widespread increase in the popularity of bicycling as a healthful and enjoyable recreational activity, as well as a renewed awareness of the bicycle's utility as an inexpensive means of individualized local transportation and recreation and also as an expanding area of competitive endeavor, such as bicycle racing. In the expanding area of competitive racing and the commercial markets derivative therefrom, perhaps the most rapidly growing segment thereof is in the so-called "motocross" field and in the specialized BMX bicyles that have been adapted thereto and developed therefrom. Such area of competitive bicycle racing differs radically from that of both the more conventional cross-cbuntry road and flat circuit bicycle racing due to the nature of the terrain involved, in the character of the bicycles that can be competitively employed therein and in the physical demands placed upon the rider. Present day BMX bicycles are characterized by a simplicity and ruggedness of construction that is reflected both in the dimensions of the frame, wheels and tires and in the pedal responsive drive trains, which are conventionally of single speed character with the components thereof sized to accommodate and withstand the high degrees of stress involved.

BRIEF DESCRIPTION OF THE INVENTION

This invention may be briefly described as an improved multispeed transmission particularly adapted for utilization as original equipment or as a conversion kit for BMX bicycles and the like. In its broader aspects, the subject invention includes a plurality of drive sprockets mounted, with intermediary overrunning clutches, on the rear wheel hub of the bicycle and with each of said sprockets being adapted to be concurrently chain driven by a corresponding plurality of relatively larger diameter sprockets mounted on the pedal drive shaft. In a narrower aspect, it includes a simple and rugged two speed transmission, wherein the intermediary overrunning clutches are normally operative to bias both of the rear wheel hub sprockets into driving engagement with the rear wheel hub but wherein the high speed drive system normally overrides the low speed system, which operatively free wheels during normal high speed cycle operation. Downshifting is effected by a limited, manually induced selective counter-rotational precessing of the cage assembly associated with the rear wheel mounted high speed sprocket for selective disengagement thereof and the automatic takeover by the low speed system. Conversely and without interruption of drive pedal sprocket rotation, upshifting is effectively and instantaneously achieved by manual release of the above noted counter-rotational precessing of the high speed cage and the reassumption of normally biased operative control thereof.

Among the advantages of the subject invention are the provision of a simple and rugged two-speed transmission for BMX cycles that is adapted to withstand the rigors attendant competitive usage thereof. Further advantages include the provision of a rugged two speed transmission for BMX cycles and the like where there is effectively no lag in positive rear wheel drive when either upshifting or downshifting.

The primary object of this invention is the provision of a simple, rugged and enduring two speed transmission for BMX cycles and the like.

Other objects and advantages of the subject invention will become apparent from the following portions of this specification and from the appended drawings which illustrate, in accord with the mandate of the patent statutes, a presently preferred drive pedal operable multi-speed bicycle transmission construction for BMX bicycles and the like that incorporates the principles of this invention.

BRIEF DESCRIPTION OF THE DRAWINGS

Referring to the drawings

DETAILED DESCRIPTION OF THE INVENTION

Figure 1:
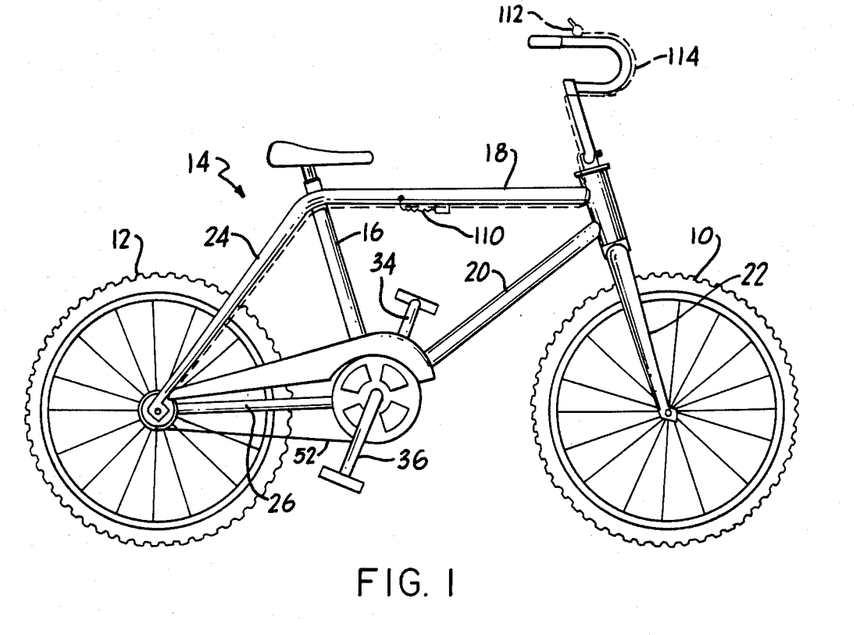
FIG. 1 is a schematic side elevational view of a BMX cycle constructed in accordance with the principles of the invention.

Referring to the drawings and initially to FIG. 1, there is illustratively depicted an essentially standard construction for a BMX cycle having a front steerable wheel 10 and a rear driving wheel 12 mounted on a frame, generally designated 14. The frame 14 is of a strengthened tubular construction and generally includes a substantially vertical seat post member 16, a horizontal upper transverse brace member 18, an angularly disposed lower member 20, a bifurcated front wheel support 22, a bifurcated rear wheel support 24 and a second bifurcated rear wheel mounting and support member defining a pair of rearwardly extending lower brace members 26. The seat post member 16, lower frame member 20 and the forward end of the rearwardly extending lower brace members 26 commonly terminate at a cylindrical pedal drive shaft hub, generally designated 30. Such BMX cycle also conventionally includes a transversely disposed drive pedal shaft 32 journalled in the hub 30 having conventional opposed left and right pedal cranks 34 and 36 terminally mounted thereon.

Figure 2:
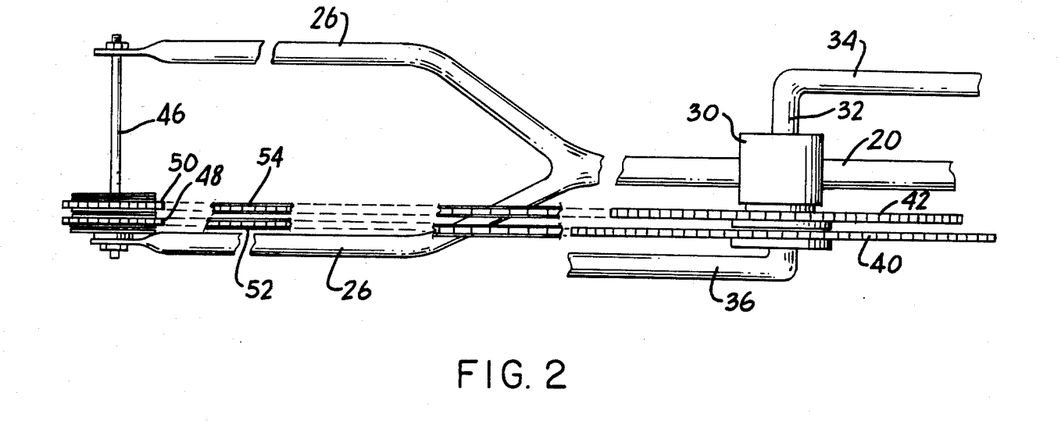
FIG. 2 is a schematic plan view of the pedal shaft drive assembly, the rear wheel drive assembly and certain bicycle frame components showing, in enlarged form, the broad nature of the subject invention.
Figure 3:
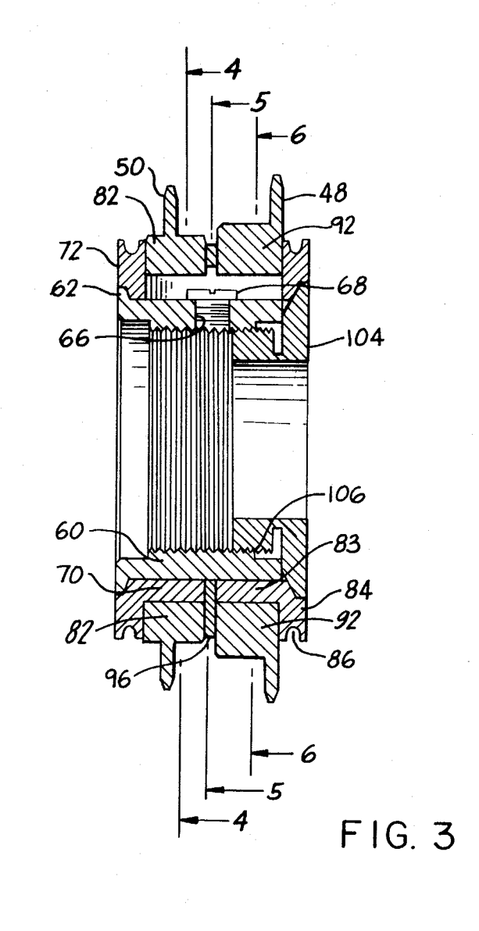
FIG. 3 is a longitudinal vertical section taken through the rear wheel drive components and showing the operative interrelationships therebetween.
Figure 4:
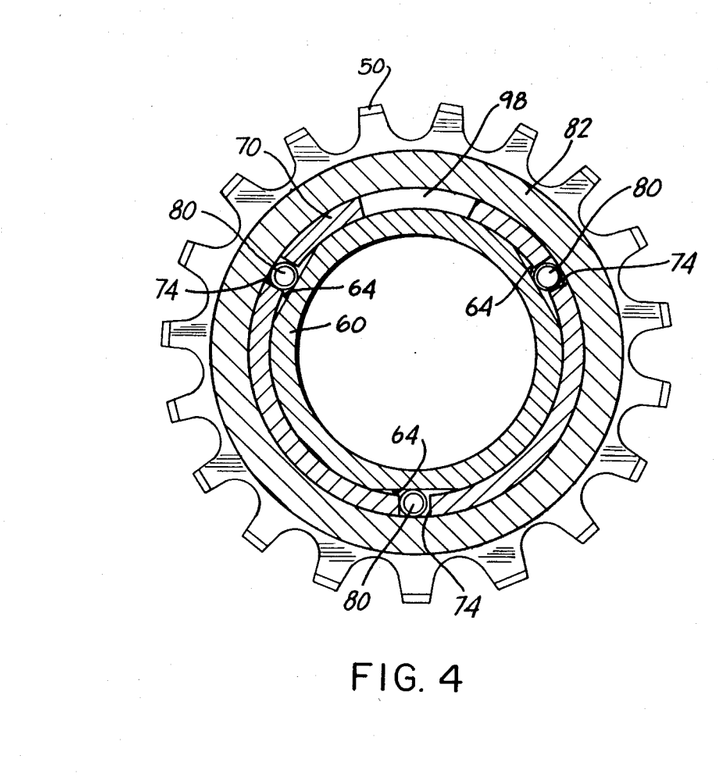
FIG. 4 is a transverse vertical section taken on the line 4—4 of FIG. 3.
Figures 5, 6, 7:
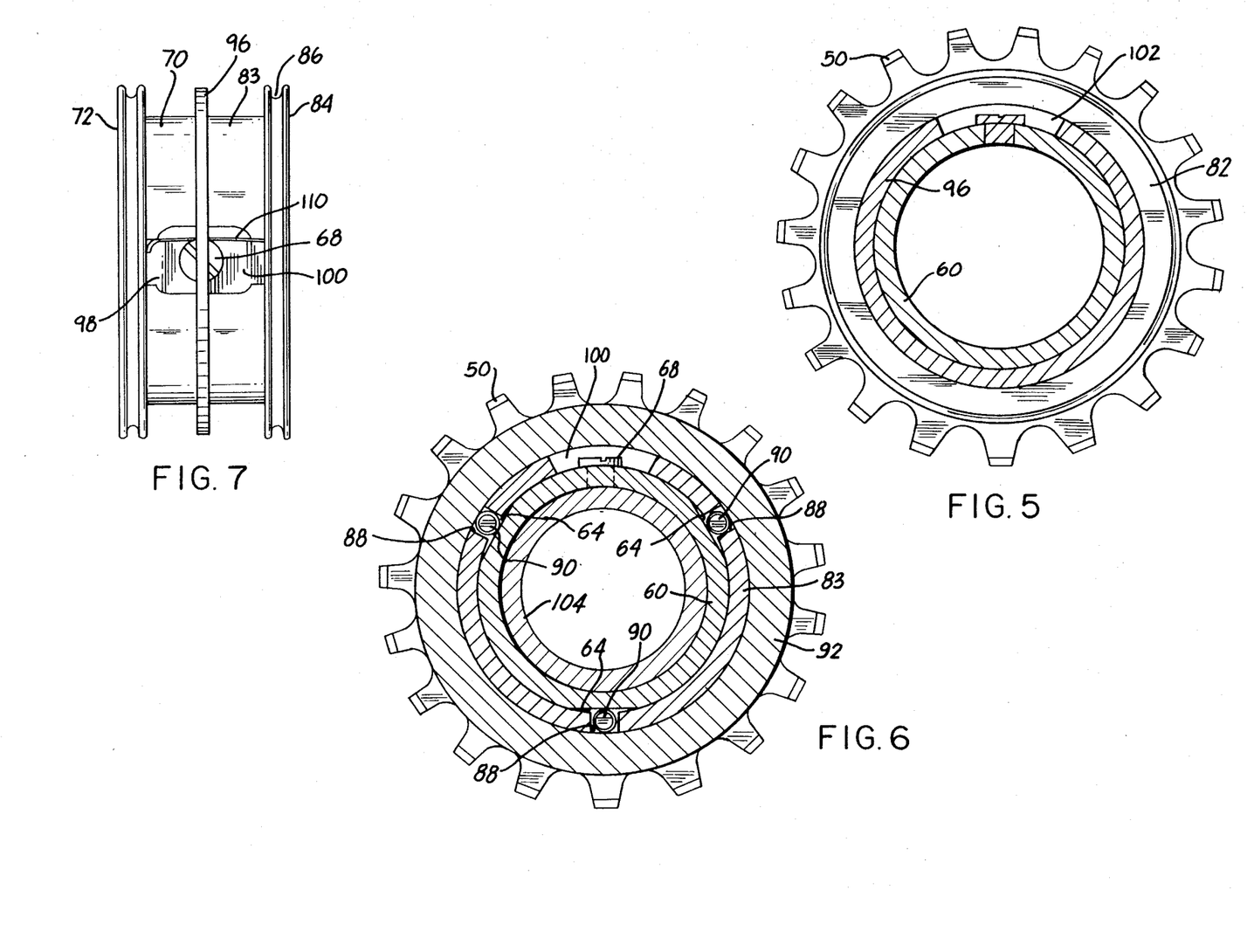
FIG. 5 is a transverse vertical section taken on the line 5—5 of FIG. 3.
FIG. 6 is a transverse vertical section taken on the line 6—6 of FIG. 3.
FIG. 7 is a plan view of the transmission shown in FIG. 3 without the rear sprocket members mounted thereon.

Referring now to FIGS. 1 and 2, there is shown a pair of relatively large diameter standard sized pedal drive sprockets 40, 42 of differing diameters disposed adjacent the right side of the hub 30. The pedal drive sprockets 40 and 42 are mounted on the pedal drive shaft 32 in closely spaced, side-by-side parallel relation. Mounted, in the manner hereinafter described, on the rear wheel hub 46 are a pair of standard sized wheel drive sprockets 48 and 50. The wheel drive sprocket 48 is directly driven by a first chain 52 encircling said sprocket 48 and the outboard pedal drive sprocket 40. In a similar manner inboard pedal drive sprocket 42 and rear wheel drive sprocket 50 are drivingly interconnected by a second chain 54. As shown, the outboard pedal drive sprocket 40 is of larger diameter than inboard pedal drive sprocket 42. Outboard wheel hub drive sprocket 48 can be of the same size as wheel hub drive sprocket 50 or can be of slightly differing diameter therefrom. In the illustrated arrangement, the outboard sprockets 40 and 48 connected by chain 52 comprise the high speed drive system whereas the inboard sprockets 42 and 50 connected by chain 54 comprise the low speed drive system.

Referring now to FIGS. 3–6 and, as pointed out above, the rear wheel hub drive sprockets 48 and 50 each include an intermediary overrunning clutch assembly. As shown, the improved drive system includes an internally threaded bushing 60 having an internal diameter sized for threaded mounting on a standard sized rear wheel hub. The threaded bushing 60 includes a peripheral retaining flange 62 and three equiangular longitudinal flats 64 chordally disposed on the outer surface thereof. Also included in the bushing 60 is a threaded radial bore 66 sized to contain a post 68.

Disposed in slideable rotatable relation with the outer surface of the bushing 60 is a first sleeve member 70 having an inboard peripheral flange 72 and three longitudinal slots 74 in general coincident equiangular alignment with the flats 64 on the outer surface of the bushing 60. The slots 74 are sized to individually accommodate a first set of three roller elements 80 and the sleeve 70 thus serves as a cage therefore. Disposed in surrounding slideable relation with the outer surface of the sleeve-cage member 70 is the base hub portion 82 of the low speed rear wheel drive sprocket 50.

In a similar manner, a second sleeve member 83 is mounted in slideable rotatable relation on the outboard surface portion of the threaded bushing 60. The sleeve 83 also includes an outboard peripheral flange 84 having a perimetric slot 86 radially disposed therein and three longitudinal slots 88 in general coincident equiangular alignment with the flats 64 on the outer surface of the threaded bushing 60. The slots 88 are sized to individually accommodate a second set of three roller elements 90 and the sleeve 83 thus serves as a cage therefore. Disposed in surrounding slideable relation with the outer surface of the sleeve-cage member 83 is the base hub portion 92 of the high speed rear wheel drive sprocket 48.

The sleeve-cage members 70 and 83 and the respective sets of rollers caged thereby are maintained in independent longitudinally spaced relation by an intermediate washer member 96. An outboard retaining sleeve 104 threadedly engaged with the internal threads in the bushing 60, as at 106, operates to maintain the above described components in longitudinally aligned assembled relation on the wheel hub.

As will be apparent to those skilled in this art, the foregoing assembly is particularly adapted for use as original equipment or as a conversion kit on the standarized threaded extension on a rear wheel hub. Alternatively however other means, such as keying, could be employed to secure the bushing 60 to the wheel hub or, in fact, a modified wheel hub could be accommodated such as an extending hub having the flats located on the surface thereof, thus dispensing with the threaded bushing 60 as a separate element, and with auxiliary means for preventing longitudinal displacement of the sprockets therealong.

The permitted degree of rotational displacement of the sleeve-cages 70 and 83 and of washer 96 relative to the threaded bushing 60 in the specifically illustrated embodiment is limited by the post member 68 and by the dimensions of the auxiliary post accommodating apertures 98 and 100 in the sleeve-cage members 70 and 83 and the corresponding aperture 102 in the spacer-washer 96.

In the operation of the above described-assembly, the low and high speed wheel drive sprockets 50 and 48 are freely rotatable relative to their respective sleeve-cage members 70 and 83 when the roller elements 80 and 90 respectively are positioned in the vicinity of the midlength of the flats 64 by appropriate positioning of the sleeve-cage members 70 or 83 relative to the bushing 62. When so located, there will be sufficient clearance between the roller periphery and the sprocket hubs to permit the latter to freely rotate with respect thereto. If, however, either of the sleeve-cage members 70 or 83 are precessed relative to the threaded bushing 60 so as to move the rollers in a direction concurrent to the direction of sprocket rotation, and to thus displace the rollers towards an end of the flats 64, the converging spatial dimension thereof creates a selective wedging relationship between the respective hubs of the sprocket members 52 and 48 and the bushing 60 through the now wedged rollers to effect direct transmittal of power from the rear wheel drive sprockets 48 and/or 50 to the internally threaded bushing 60 and hence to the rear wheel of the cycle.

In the normal operation of the described cycle, rotation of the pedal cranks 34 and 36 by the rider will effect conjoint rotation of both rear wheel hub drive sprockets 48 and 52 through their respective chains. Under such conditions, the frictional effects inherent in the system will normally operate to bias both the sleeve-cage members 70 and 83 in an advanced precessed position with their respective rollers 80 and 90 being initially disposed towards or into a wedged relation intermediate the respective sprocket hubs 82 and 92 respectively and the outer surface of the threaded bushing 60. However, in order to insure such initial prebiasing of both sleeve-cages 70 and 83 into the advanced precessed or drive position relative to the bushing 60 and with both sets of rollers in wedged condition, a biasing spring 110 is desirably positioned within the apertures 98 and 100 traversing the post 68. Under the above described conditions, the wedging action maintained by the rollers 90 associated with the high speed rear wheel drive sprocket 48 and the high speed drive system will normally be maintained in control, with the low speed system being overridden and free wheeling on the bushing 60. This free wheeling is due to the relative reverse rotation of the low speed sprocket about the threaded bushing, thus negating or effectively avoiding any operative wedging action by the rollers between the low speed sprocket 50 and the threaded bushing 60.

Disengagement of the high speed drive system and automatic shiftover to low speed drive is effected by a selective counter-rotational precessing of the high speed sleeve-cage member 83 relative to the threaded bushing 60 by an amount sufficient to locate the roller members 90 in the vicinity of the middle of the flats 64. Such selective high speed sleeve-cage and roller displacement breaks the heretofore extant wedging action through relocation of the rollers. The clearance so provided when the rollers are located at the middle of the flats 64 permits the high speed sprocket 48 to free wheel on the bushing 60.

Upon the disengagement of the high speed drive as described above, the low speed drive will immediately engage with the rollers 80 being wedged into driving condition with the bushing 60 and the hub 82 of the low speed wheel drive sprocket 52. As pointed out above, such transfer to low speed drive will be automatically insured by the action of the biasing spring 110. Control by such low speed drive system will be maintained for as long as the high speed sleeve-cage 70 is manually positioned to maintain the rollers 90 in the vicinity of the midlocation of the flats 64. Resumption of high speed control will automatically and immediately be resumed upon a return precession of the high speed sleeve-cage member 83 to its normally biased advanced or drive position that places the rollers 90 in wedged or driving condition intermediate the sprocket hub 92 and threaded bushing 60.

Manual control of the positioning of the high speed sleeve-cage 70 relative to the flats 64 on bushing 60 is readily effected by a manual control lever 112 operative against a suitable return spring 110 and through a cable 114 operatively connected to the perimetric slot 86 on the flange 84 of high speed sleeve-cage member 83. As will be apparent, the depression of the lever 112 in association with a slight and momentary diminution in drive torque will operate to selectively counter-rotationally precess the high speed sleeve-cage 83 against the action of return spring 110 and effect the automatic shiftover to low speed drive operations. Such low speed control will be maintained until the lever 112 is released at which time, as described above, high speed operation will be automatically and immediately resumed.

As will now be apparent to those skilled in this art, the gear ratios for the high and low speed drive systems may be preselected to accommodate the conditions of intended usage of the bicycle. One suitable gear ratio employing standard sized sprockets may comprise a 2.74/1 ratio for high speed drive effected by 52 teeth on pedal sprocket 40 and 19 teeth on the wheel drive sprocket 48 and a 2/1 ratio for the low speed drive effected by 40 teeth on the pedal drive sprocket 42 and 20 teeth on wheel drive sprocket 52.

Figures 8, 9:
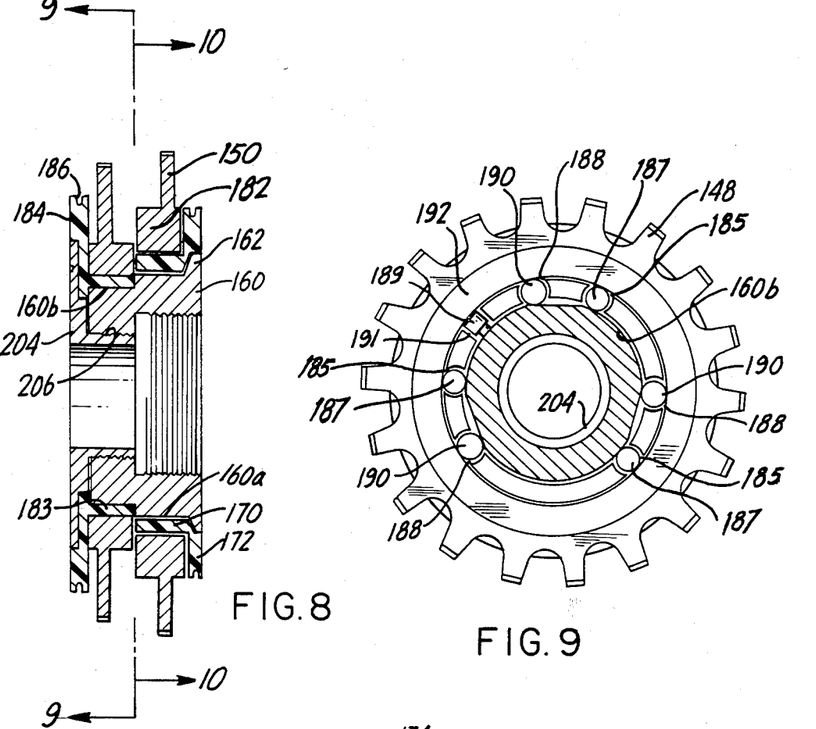
FIG. 8 is a longitudinal vertical section taken through the rear wheel drive components of an alternative construction and showing the operative interrelationships therebetween.
FIG. 9 is a transverse vertical section taken on the line 9—9 of FIG. 8.
Figure 10:
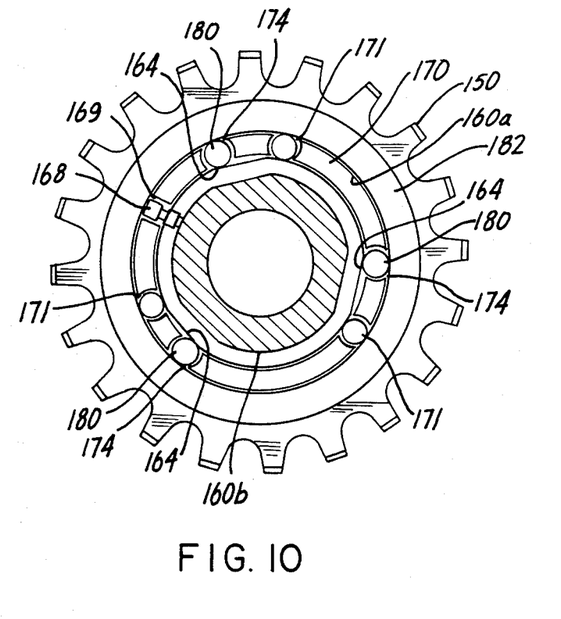
FIG. 10 is a transverse vertical section taken on the line 10—10 of FIG. 8.

FIGS. 8–10 illustrate an alternative construction of a two speed bicycle rear wheel transmission incorporating the principles of this invention. There is provided an internally threaded bushing 160 having an internal diameter sized for threaded mounting on a standard sized rear wheel hub. The bushing 160 includes a peripheral retaining flange 162 and three equiangular longitudinal flats 164 chordally disposed on the larger diameter outer surface 160a thereof. Also included in the bushing 160 is a threaded radial bore sized to contain a post 168.

Disposed in encircling relation with the outer surface of the bushing 160 is a first sleeve member 170 having an inboard peripheral flange 172 and three longitudinal slots 174 in general coincident equiangular alignment with the flats 164 on the outer surface of the bushing 160. The slots 74 are sized to individually accommodate a first set of three roller elements 180 and the sleeve 170 serves as a cage therefore.

The first sleeve member 170 also includes a second set of three longitudinal slots 171 in general equiangular alignment and disposed intermediate the flats 164 on the outer surface of the bushing 160. The slots 171 are sized to individually accommodate a second set of roller elements 173 which are desirably of slightly smaller diameter than the roller elements 180. The sleeve member 170 and slots 171 serve as a cage for the rollers 173 and conjointly serve as a roller bearing intermediate the bushing 160 and the hub portion 182 of the low speed rear wheel drive sprocket 150.

The post 168 is disposed within an auxiliary aperture 169 in sleeve member 170 and the relative dimensions thereof operate to limit displacement of the sleeve 170 so as to maintain the first set of rollers within the operative orbit of the flats 164 and the second set of rollers 173 intermediate such flats.

In a similar manner, a second sleeve member 183 is mounted in slideable rotatable relation on the outboard and reduced diameter surface portion 160b of the bushing 160. The sleeve member 183 also includes an outboard peripheral flange 184 having a perimetric slot 186 radially disposed therein. The sleeve 183 includes a first set of three longitudinal slots 188 in general coincident equiangular alignment with the flats 164 on the outer surface 160b of the bushing 160. The slots 188 are sized to individually accommodate a set of three rollers elements 190 and the sleeve member 183 thus serves as a cage therefore. The sleeve member 183 also includes a second set of longitudinal slots 185 in general equiangular alignment and disposed intermediate the flats 164 on the outer surface 160b on the bushing 160. The slots 185 are sized to contain a second set of roller elements 187 which again are of slightly smaller diameter than the roller elements 190. The sleeve member 183 and slots 185 serve as a cage for the rollers 187 and conjointly serve as a roller bearing intermediate the bushing 160 and the hub portion 192 of the sprocket 148.

A post 189 is disposed within an auxiliary aperture 191 in sleeve member 183 and the relative dimensions thereof operate to limit the displacement of the sleeve 183 so as to maintain the first set of rollers 190 within the operative orbit of the flats 164 and the second set of rollers 187 intermediate such flats.

An outboard retaining sleeve 204 threadedly engaged with the internal threads of bushing 160 as at 206 operates to maintain the above described components in longitudinally aligned assembled relation on the wheel hub.

The operation of the above described unit is essentially the same as that described earlier with respect to the Figures 3–7 embodiment and will not be here repeated.

FIGS. 11–19 illustrate another alternative and presently preferred construction of a two speed bicycle rear wheel transmission incorporating the principles of this invention. There is here provided an internally threaded bushing 220 having an internal diameter sized for threaded mounting on a standard sized rear wheel hub. The bushing 220 includes a peripheral retaining flange 222 and six equiangular longitudinal flats 224 chordally disposed on the larger diameter outer surface of hub portion 226 thereof. The bushing 220 further includes six additional equiangularly disposed longitudinal flats 228 chordally disposed on the outer and smaller diameter hub portion 230 thereof. As best shown in FIG. 12a the flats 228 are desirably disposed in intermediate offset relation with the flats 224 on the larger diameter hub portion 226. Also included in the bushing 220 are a pair of threaded radial bores sized to contain posts 232 and 234.

Disposed in encircling relation with the surface of the inner hub portion 226 of the bushing 220 is a first sleeve member 236 (see also FIGS. 14 and 15) having an inboard peripheral flange 238 and six longitudinal slots 240 in general coincident equiangular alignment with the flats 224 on the outer surface of the inner hub portion 226 of said bushing 220. The slots 240 are sized to individually accommodate a first set of six roller elements 242 and the sleeve 236 serves as a cage therefor. Disposed in surrounding relation with the first sleeve member 236 is the hub portion 182 of the low speed rear wheel drive sprocket 150.

As was the case for the previously described embodiments, it is desirable to positively bias the roller elements toward the wedging or drive location on the flats. One expedient for such desired biasing is illustrated at 244 on FIG. 19. As there shown, the cage or sleeve 236 includes chordal bores 246 traversing the slots 240 and terminating in blind holes 248 each containing a compressed spring 250, the free ends of which engages rollers 242 and bias them toward one end of the slots 240.

Figure 11:
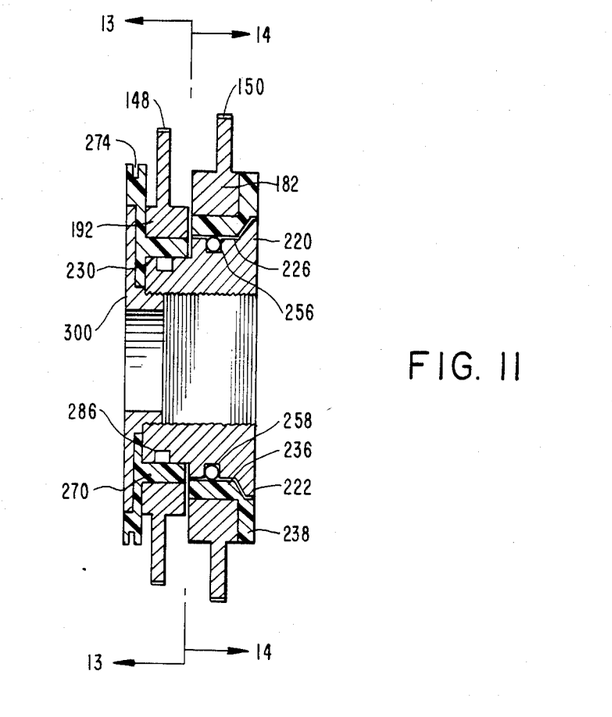
FIG. 11 is a longitudinal vertical section taken through the rear wheel drive components of a further alternative construction embodying the principles of this invention.
Figure 12A:
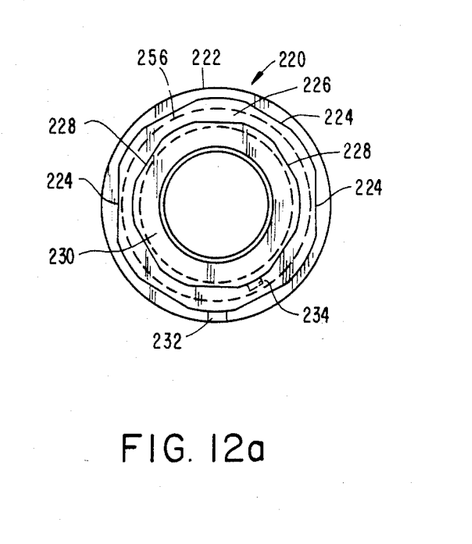
FIGS. 12a and 12b are front and side elevations of the bushing member incorporated in the construction of FIG. 11.
Figure 12B:
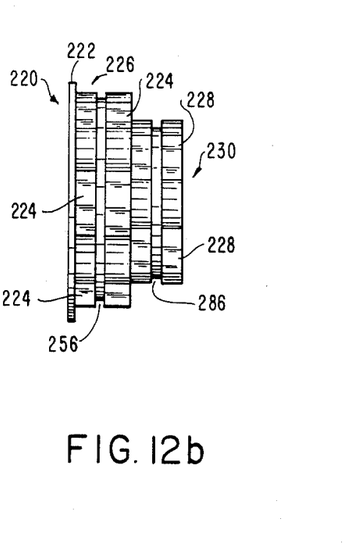
Figure 18:
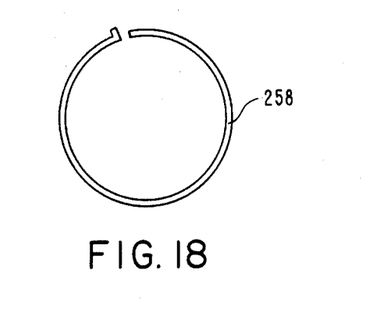
FIG. 18 is an elevation of the form of circular biasing ring employed in the embodiment of FIG. 11.
Figure 19:
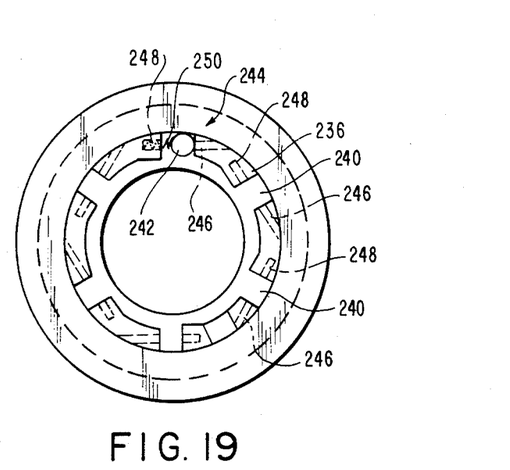
FIG. 19 is a schematic side elevation of a cage member employing an alternative form of spring biasing for the roller elements.

A simpler and preferred biasing mechanism is shown in FIGS. 11, 12 and 18. As there shown, the hub portion 226 of the bushing 220 is provided with a circumferential groove 256 adapted to accommodate a circular biasing spring 258 therewithin. The groove 256 is of an effective diameter so as to normally position a portion of the spring 258 arcuately above the midlength of the surface of each of the flats 224, when the rollers 242 are located on the drive or wedging location adjacent the ends of the flats. The groove 256 is of sufficient depth in the portions of the bushing surface defined by the center of the flats 224 to accommodate the spring 258 therewithin when the latter is downwardly depressed by roller engagement therewith at locations other than the roller wedging or driving situs adjacent the ends of the flats. Concomitantly, the depth of the groove 256 in the areas intermediate the flats 224 will be of somewhat greater and sufficient depth to always fully contain the spring 258. As will be now apparent, the outer surface of the spring 258 will normally be disposed above the surface of the flats 224 in the vicinity of the midlength thereof and will normally function to bias the roller elements 242 radially outward and toward the ends of the flats. When, however, the roller elements 242 are positively displaced out of the wedging or driving position at the ends of the flats 224 and moved toward the center of the flats, the rollers will depress the spring 258 into the underlying groove 256 to permit such rollers to be in disengaged condition.

The post 232 is adapted to be disposed within the auxiliary aperture 262 in sleeve member 236 and the relative dimensions thereof operate to limit rotative displacement of the sleeve 236 relative to the bushing 220 so as to maintain the set of rollers 242 within the operative orbit of the flats 224.

Figure 13:
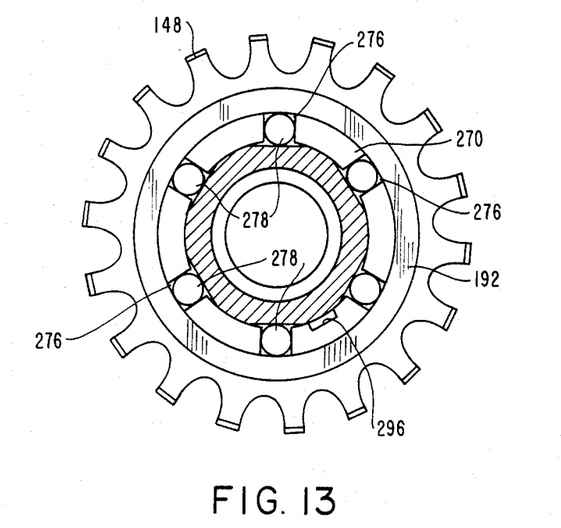
FIG. 13 is a transverse vertical section taken on the line 13—13 of FIG. 11.
Figure 14:
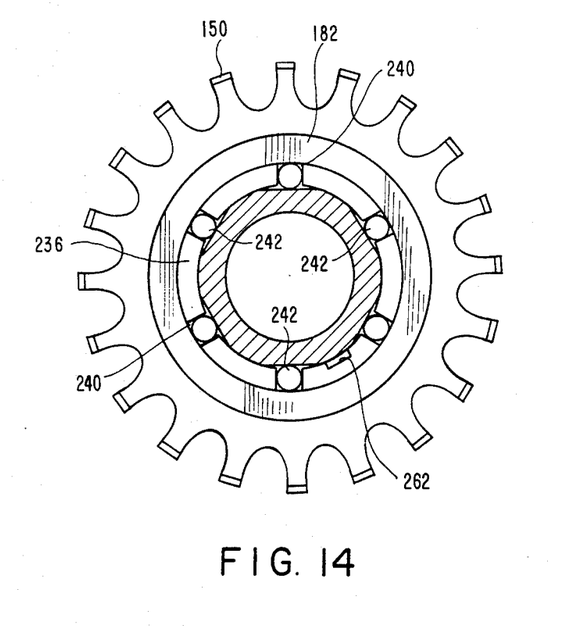
FIG. 14 is a transverse vertical section taken on the line 14—14 of FIG. 11.
Figure 15A:
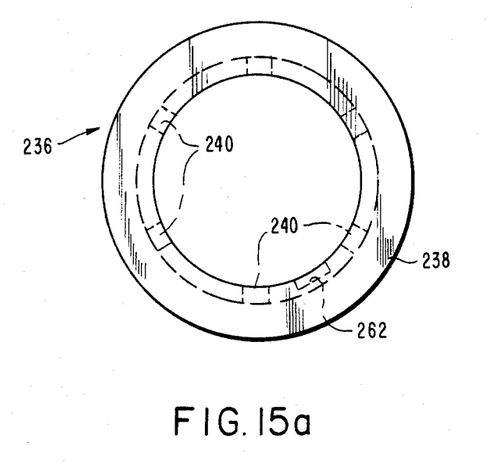
FIGS. 15a and 15b are front and side elevations of the cage or sleeve member adapted to be mounted on the larger diameter hub portion of the bushing.
Figure 15B:
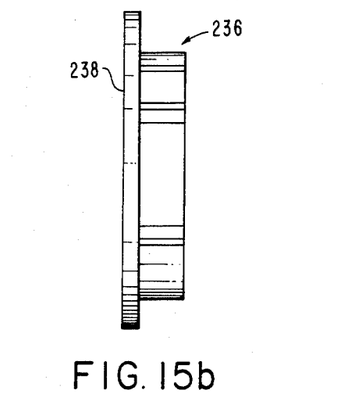

In a similar manner, a second sleeve member 270 is mounted in limited slideable rotatable relation on the outboard and smaller diameter hub portion 230 of the bushing 220. The second sleeve member 270 also includes an outboard peripheral flange 272 having a perimetric slot 274 radially disposed therein. As best shown in FIG. 13, the sleeve 270 includes a first set of six longitudinal slots 276 in general coincident equiangular alignment with the flats 228 on the hub portion 230 of the bushing 220. The slots 276 are sized to individually accommodate a set of six roller elements 278 and the sleeve member 270 thus serves as a cage therefore. Disposed in surrounding relation with the second sleeve member 270 is the hub portion 192 of the high speed rear wheel drive sprocket 148.

Figure 16A:
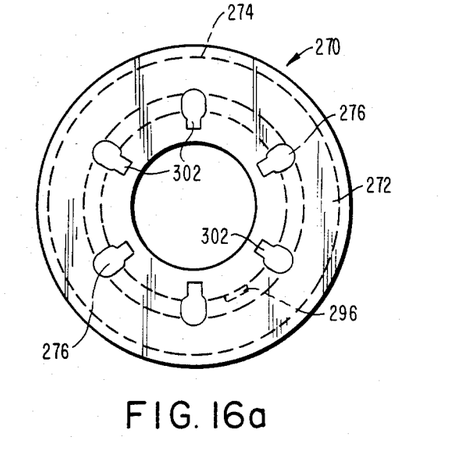
FIGS. 16a and 16b are front and side elevations of the cage or sleeve member adapted to be mounted on the smaller diameter hub portion of the bushing.
Figure 16B:
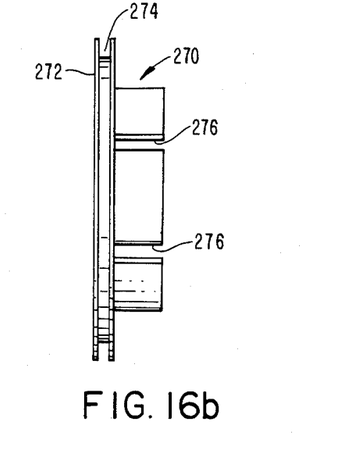

As best shown in FIG. 16a the peripheral flange portion 272 also contains a plurality of appropriately located keyhole shaped apertures 302 therein to permit insertion of a spring member depressing jig and the roller members 278 therethrough into operative relation intermediate the hub portion 230 and the hub portion 192 of the high speed rear wheel drive sprocket 148.

Figure 17:
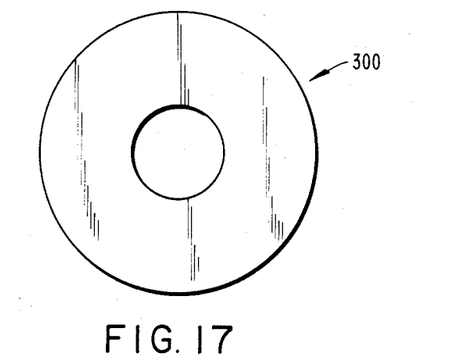
FIG. 17 is an elevation of an outboard retainer mechanism.

As shown in FIGS. 11 and 17, an outboard retaining sleeve 300 is threadedly engaged with the internal threads of the bushing 220 and operates to maintain the above described components in longitudinally aligned assembled relation on the rear wheel hub and to cover the keyhole shaped apertures on the flange portion 272.

In a manner similar to that previously described in connection with the larger diameter hub portion 226 the smaller diameter hub portion 230 of the bushing 220 is also desirably provided with a circumferential groove 286 adapted to accommodate a circular biasing spring, such as 258, therewithin. The groove 286 is of an effective diameter so as to normally position a portion of the spring arcuately above the surface of the midlength of the flats 228 when the rollers 278 are located in the drive or wedging position. The groove 286 is of sufficient depth in the portions of the bushing surface defined by the center of the flats 228 to accommodate the spring therewithin when the latter is downwardly depressed by roller engagement therewith at locations other than the roller wedging or driving situs adjacent the ends of the flats. Concomitantly, the depth of the groove 286 in the areas intermediate the flats 228 will be greater and of sufficient depth to always fully contain the spring. As will be now apparent, the outer surface of the spring will normally be disposed above the surface of the flats 228 in the vicinity of the midlength thereof and will normally function to bias the roller elements 278 radially outwardly and toward the ends of the flats. When, however, the roller elements 278 are positively displaced out of the wedging or driving position at the ends of the flats 228, as by the earlier described precession of the sleeve 270, the rollers will depress the spring 288 into the underlying groove 286.

The post 234 is disposed within the auxiliary aperture 296 in sleeve member 270 and the relative dimensions thereof operate to limit the displacement of the sleeve 270 so as to maintain the set of rollers 278 within the operative orbit of the flats 228.

The clutching and declutching operation of the above described unit is essentially the same as that described earlier with respect to the embodiments shown in FIGS. 3-7 and will not be here repeated.

Having thus described my invention, I claim:

1. A multispeed transmission system for BMX bicycles and the like having a frame, a pedal drive shaft and a rear wheel having a transverse hub, comprising
    a high and a low speed pedal drive sprocket fixedly mounted in parallel closely spaced adjacent relation on the pedal drive shaft on one side of said frame,
    an exposed portion of said hub extending transversely from said rear wheel on said one side of said frame providing a transmission system support surface,
    a high and a low speed wheel drive sprocket mounted in parallel closely spaced adjacent relation on said transmission system support surface portion of said rear wheel hub.
    a first drive chain connecting said high speed pedal and wheel sprockets,
    a second drive chain connecting said low speed pedal and wheel sprockets,
    a first overrunning roller element clutch disposed intermediate said high speed wheel drive sprocket and said transmission system support surface portion of said rear wheel hub,
    a second overrunning roller element clutch disposed intermediate said low speed wheel drive sprocket and said transmission system support surface portion of said rear wheel hub,
    said high speed wheel drive sprocket being normally biased in response to rotation of said pedal drive shaft into controlling driving relation with said rear wheel hub through said transmission system support surface to drive said rear wheel and in overriding relation with said low speed wheel drive sprocket, and
    means responsive to manual manipulation by a rider of said bicycle for selectively and temporarily disengaging said high speed wheel drive sprocket from driving relation with said rear wheel hub to permit said low speed wheel drive sprocket to drive said rear wheel without effective interruption of drive in response to continued rotation of said pedal drive shaft,
    wherein said first and second overrunning clutches each comprise a cage member and roller means displaceable into wedged driving engagement intermediate said wheel sprockets and said transmission system support surface on said rear wheel hub.

2. A multispeed transmission as set forth in claim 1 wherein said low speed wheel drive sprocket free wheels during the period of time said high speed wheel drive sprocket drives said rear wheel.

3. A multispeed transmission as set forth in claim 1 including a spring member for normally biasing each said roller means into wedged driving engagement intermediate said wheel sprockets and said extending portion of said wheel hub.

4. A multispeed transmission as set forth in claim 1 wherein said means for selectively disengaging said high speed wheel drive sprocket from driving relation with said rear wheel hub further comprises means connected to said manually manipulable means for counterrotationally precessing the cage member and rollers of said first overrunning clutch to remove said rollers from wedged driving engagement intermediate said high speed wheel sprocket and said rear wheel hub.

5. A multispeed transmission as set forth in claim 1 further including
    a bushing member mounted on said exposed portion of said hub having a plurality of longitudinally disposed chordal flats on the outer surface thereof defining tapered channels for permitted displacement of said roller means.

6. A multispeed transmission for use with BMX bicyles and the like having a frame, a pedal drive shaft, a rear wheel having a transverse hub portion extending therefrom on one side of said frame comprising
    a cylindrical bushing member sized to be mounted on said extending portion of said rear wheel hub for rotation in conjunction therewith,
    a plurality of chordal flats each having a pair of end portions and an intermediate midlength area disposed on the outer surface of said bushing parallel to the longitudinal axis thereof,
    a first high speed roller cage member mounted in encircling relation with said bushing and displaceable to selectively position a first set of roller members relative to said chordal flats,
    a first high speed sprocket member mounted in encircling relation with said first roller cage member and rotatably displaceable relative to said bushing only when said first cage member locates said first set of rollers in the vicinity of the midlength area of said chordal flats and drivingly engaged for concurrent rotation therewith when said first cage member locates said first set of rollers in wedged relation intermediate said high speed sprocket and bushing at a location remote from said flat midlength area,
    a second and low speed roller cage member mounted adjacent to said first roller cage member in encircling relation with said bushing and displaceable to selectively position a second set of roller members relative to said chordal flats,
    a second and low speed sprocket member mounted in encircling relation with said second roller cage member and rotatably displaceable relative to said bushing only when said second roller cage member locates said second set of rollers in the vicinity of the midlength area of said chordal flats and drivingly engaged for concurrent rotation therewith when said second roller cage member locates said second set of rollers in wedged relation intermediate said second and low speed sprocket and bushing at a location remote from said flat midlength area, said first roller cage member and first set of roller members being normally positioned relative to said chordal flats in response to rotation of said pedal drive shaft by a rider of said bicycle to bias said high speed sprocket member into controlling driving relation with said bushing to drive the latter and in overriding relation with said low speed sprocket member, and means responsive to manual manipulation by a rider of said bicycle for selectively and temporarily displacing said first roller cage member relative to said bushing to locate said first set of rollers in the vicinity of the midlength area of said flats to disengage said high speed sprocket from controlling driving engagement with said bushing and to permit said low speed sprocket to assume controlling driving engagement therewith in response to continued rotation of said pedal drive shaft.

7. A multispeed transmission as set forth in claim 6 including a spring member for biasing each said roller cage member and roller members associated therewith into wedged driving engagement intermediate said high and low speed wheel sprockets and said bushing.

8. A multispeed transmission as set forth in claim 6 wherein said first ans second roller cage members each selectively position a second set of roller members intermediate said chordal flats on said bushing member.

9. A multispeed transmission as set forth in claim 6 wherein said bushing member includes a pair of cylindrical surfaces of differing external diameter each including said plurality of chordal flats thereon.

10. a multispeed transmission as set forth in claim 6 wherein said bushing member includes at least one circumferential groove of a depth to extend through said chordal flats thereon, a circular spring member disposed within said groove sized to be normally located in spaced arcuate overlying relation with the midlength of each of said chordal flats for normally biasing one of said sets of roller elements into wedged driving relation intermediate said bushing member and its associated sprocket member, said groove being of a depth at the midlength of said chordal flats to receive said spring member therein when the latter is displaced thereinto by the presence of a roller member in overlying relation therewith.

11. A multispeed transmission as set forth in claim 6 wherein said bushing member includes first and second cylindrical surfaces each including said plurality of chordal flats thereon, a circumferential groove in each of said cylindrical surfaces of a depth to extend through said shordal flats thereon, a circular spring member disposed in each said groove sized to be normally located in spaced arcuate overlying relation with the midlength of each of said chordal flats for normally biasing said first and second sets of roller elements into wedged driving relation intermediate said bushing member and their respective associated high speed and low speed sprocket members.

12. A multispeed transmission as set forth in claim 9 wherein each of said cylindrical surfaces has six equiangularly located chordal flats thereon.

13. A multispeed transmission as set forth in claim 6 wherein at least one of said cage members includes a roller containing slot therein, a chordal bore traversing said roller containing slot and terminating in a blind hole on one side thereof, spring means mounted in said blind hole and engageable with a roller disposed in said slot for normally biasing said roller toward one end of said slot.

* * * * *